United States Patent [19]

Carlier et al.

[11] 4,056,435
[45] Nov. 1, 1977

[54] LOADING AND UNLOADING OF A NUCLEAR REACTOR CORE

[75] Inventors: Jacques Carlier, Aix-en-Provence; Bernard Risbourg, St. Paul-lez-Durance, both of France

[73] Assignee: Commissariat a l'Energie Atomique, Paris, France

[21] Appl. No.: 593,443

[22] Filed: July 7, 1975

[30] Foreign Application Priority Data

July 11, 1974 France .............................. 74.24158

[51] Int. Cl.² ...................... G21C 19/06; G21C 19/10
[52] U.S. Cl. .................................. 176/30; 176/DIG. 3
[58] Field of Search .................... 176/30-32, 176/36 R, 40, 87, DIG. 3

[56] References Cited

U.S. PATENT DOCUMENTS

| 3,089,836 | 5/1963 | Wootton | 176/30 |
|---|---|---|---|
| 3,282,793 | 12/1966 | Vamrog | 176/30 |
| 3,354,040 | 12/1967 | Frame et al. | 176/29 |
| 3,635,792 | 1/1972 | Barker | 176/32 |
| 3,677,328 | 7/1972 | Buzzi et al. | 176/30 |
| 3,733,250 | 5/1973 | Van Santen et al. | 176/30 |
| 3,765,549 | 10/1973 | Jones | 176/30 |
| 3,836,429 | 9/1974 | Frisch et al. | 176/29 |
| 3,836,430 | 9/1974 | Frisch et al. | 176/30 |
| 3,883,012 | 5/1975 | Jones | 176/30 |
| 3,935,062 | 1/1976 | Keller et al. | 176/30 |
| 3,943,037 | 3/1976 | Siegert et al. | 176/30 |

FOREIGN PATENT DOCUMENTS

| 2,246,637 | 3/1974 | Germany | 176/30 |
|---|---|---|---|
| 935,258 | 8/1963 | United Kingdom | 176/30 |

Primary Examiner—Samuel W. Engle
Assistant Examiner—S. A. Cangialosi
Attorney, Agent, or Firm—Cameron, Kerkam, Sutton, Stowell & Stowell

[57] ABSTRACT

A water-cooled reactor comprises an outer containment vessel and an internal pressure vessel provided with a top closure cap, a pool structure having a bottom orifice located above the pressure vessel and a second orifice providing a communication with a leak-tight compartment for the storage of fuel assembly containers, means for lifting and transferring the pressure vessel cap to and from a storage well, means for lifting and transferring the fuel assemblies to the storage compartment.

6 Claims, 6 Drawing Figures

LOADING AND UNLOADING OF A NUCLEAR REACTOR CORE

This invention relates to a water-cooled nuclear reactor.

In more exact terms, the invention is concerned with a group of installations which surround the pressure vessel of a water-cooled reactor and permit unloading of fuel materials from a nuclear reactor and reloading of said materials, said group of installations being more especially adapted to the case in which the nuclear reactor is installed on a ship.

It is known that, in a nuclear reactor and especially in a reactor of the PWR type, unloading of spent fuel and reloading with fresh fuel entail the need for reactor shutdown. It is readily apparent that, in order to ensure maximum economic performance of the reactor, these loading and unloading operations must be as rapid as possible.

A number of methods have already been proposed for refuelling a reactor of the PWR type. Mention can be made in particular of French Pat. application No. 71 240 117 filed in the name of Westinghouse Electric Corporation in respect of "Methods of refuelling of a nuclear reactor". This method involves the following stages: actuation of slackening means for releasing and removing in a single operation the studs which serve to secure the reactor cap to the pressure vessel, displacement of the top structure together with all its equipment in a single lifting operation to a given location on one side so as to provide access to the reactor core and to permit replacement of said fuel assemblies.

In the case of a reactor which is employed for ship propulsion, the conditions of reactor operation are clearly appreciably different from those to be found in a reactor which is constructed on land. In particular, the space available especially in height for all the installations surrounding the reactor is much smaller, with the result that it is much more difficult to satisfy safety standards, in particular at the time of fuel handling operations. By reason of the limited space, it is impossible to employ the refuelling installations described in the patent mentioned earlier. Moreover, for reasons of safety, it is necessary to ensure that all handling operations take place within a leak-tight enclosure. It is also highly desirable to ensure that no handling operation is carried out by means of cables above the reactor core. Finally, the irradiated fuel assemblies must be discharged from the ship after a period of decay within transport flasks which do not present any danger of radioactivity and contamination at the time of withdrawal from the storage zone.

The present invention is precisely directed to a water-cooled nuclear reactor in which all the conditions set forth in the foregoing can be more fully satisfied than in the installations of the prior art.

The nuclear reactor of the water-cooled type in accordance with the invention essentially comprises an outer containment vessel in which provision is made in the lower portion of said outer vessel for a pressure vessel having a top closure cap and containing a reactor core constituted by a plurality of vertical fuel assemblies, upper internal structures placed above said core and said pressure vessel, a structure having a horizontal bottom wall and adapted to serve as a pool, provision being made in said bottom wall for a first orifice located above said pressure vessel and having a diameter which is slightly larger than that of said closure cap and for a second orifice providing a communication between the structure aforesaid and a leak-tight storage compartment which is partially contained within the outer containment vessel and located at a lower level than said structure, said compartment being intended to accommodate containers for the storage of fuel assemblies, said containers being capable of moving from a position located beneath said second orifice to a position located beneath a third orifice which opens to the exterior of the outer containment vessel, a well for the storage of the pressure vessel cap, first means for lifting the pressure vessel cap and transferring said cap to said storage well, second means for lifting the fuel assemblies and transferring said assemblies to the storage compartment and means for providing a leak-tight connection between the bottom wall of said structure at the level of the first orifice and the top flange of said pressure vessel.

In accordance with a first characteristic feature, the first lifting means are constituted by a machine which is movable on rails extending above said structure from the zone located above the first orifice of said structure to the closure-cap storage zone.

In accordance with a second characteristic feature, the second means for lifting and transferring fuel assemblies are constituted by a telescopic transfer hood displaceable by rolling means on rails which extend above the structure aforesaid between the zone located above the first orifice of the structure to the zone located above the second orifice of said structure, said transfer hood being such as to have a first portion which is rigidly fixed to rolling means and a second movable portion which is capable of sliding in a vertical direction within said first portion, said movable portion being provided with an internal compartment which is capable of containing a fuel assembly, and means for lifting the fuel assemblies into said compartment.

In a preferred embodiment, the storage compartment contains a plurality of containers, each container being provided with an outer casing and a magazine of the rotary drum type having a number of fuel assembly storage locations, said outer casing being provided with an orifice beneath which each storage location is capable of passing, said container being fitted with an internal heat exchanger for cooling the stored fuel assemblies.

A better understanding of the invention will in any case be obtained from the following description of one embodiment of the invention which is given by way of example without any limitation being implied, reference being made to the accompanying drawings, wherein.

Figure 1:
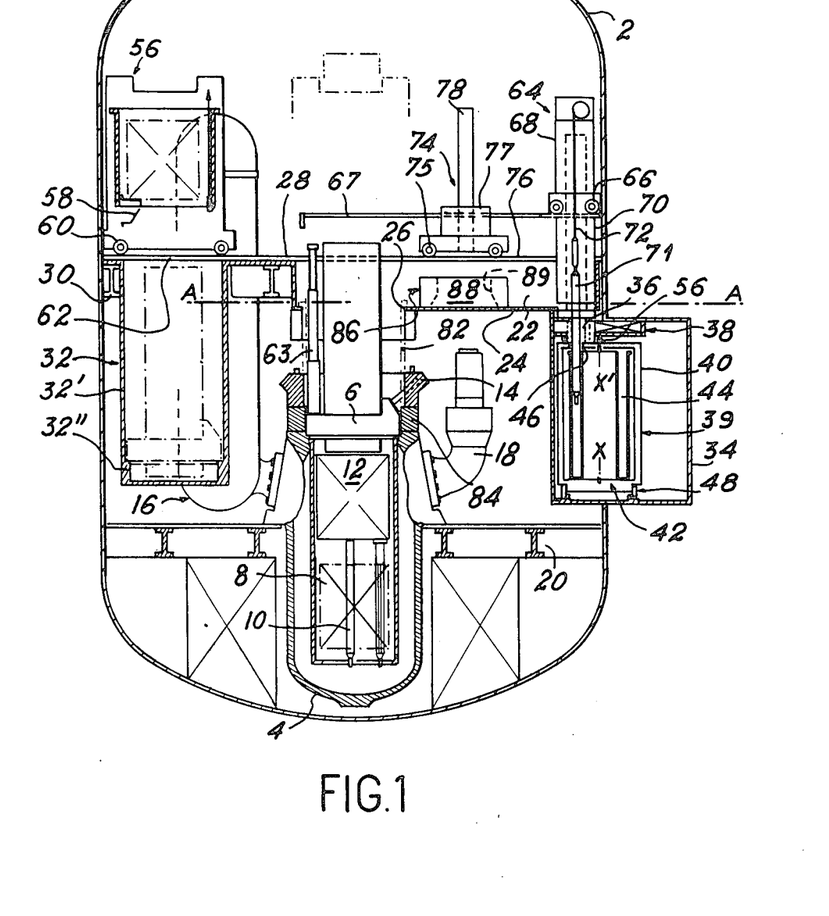
FIG. 1 is a sectional view in elevation of the reactor.
Figure 6:
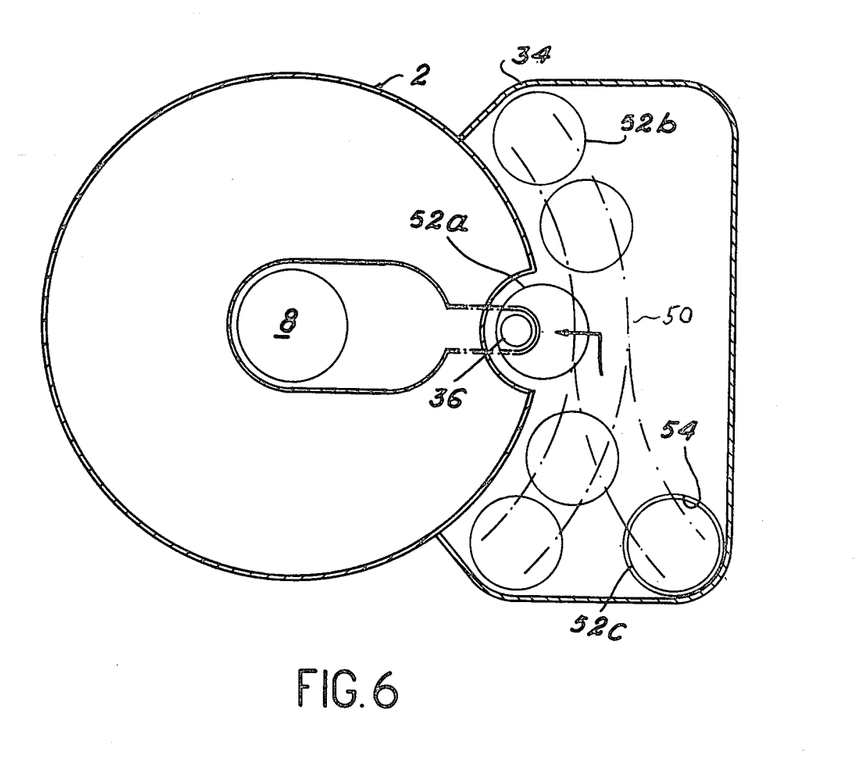
FIG. 6 is a top view of the installation, this view being taken in cross-section along the plane A—A of FIG. 1.

The reactor as a whole will be described with reference in particular to FIGS. 1 and 6. There is shown in FIG. 1 the leak-tight reactor containment vessel 2 which encloses the entire installation. Within the interior of the containment vessel 2, provision is essentially made for the pressure vessel 4 which is closed at the top end by a cap 6. The pressure vessel 4 encloses in known manner the reactor core 8 which is constituted by the fuel assemblies such as the assembly 10. The reactor core is surmounted by upper internal structures 12 comprising the control rod guide assemblies and the reactor instrumentation devices.

The closure cap 6 is secured to the pressure vessel 4 by clamping means 14 which are shown diagrammatically and are also of known type. Heat exchangers as designated by the reference 16 and pumps as designated by the reference 18 are also clearly associated with the reactor. The positions of said heat exchangers and pumps are such that these latter free the portion of space which is located above the closure cap 6. The pressure vessel 4 rests on support structures which are represented diagrammatically by the reference 20. There is also provided within the interior of the containment vessel 2 a structure 22 having a horizontal bottom wall 24 and placed at a higher level than the closure cap 6 of the pressure vessel 4. Said structure 22 serves as a pool as will be explained hereinafter. The bottom wall 24 of the structure 22 has a first orifice 26 which is formed at the level of the pressure vessel 4 and has a diameter which is slightly larger than the external diameter of the closure cap 6 so tht this latter is thus permitted to pass through said orifice. The structure 22 which serves as a pool has an extension in the form of a floor 28 which is supported for example, by structural beams such as the beam 30. An opening is formed in the floor 28 for a storage zone 32 which, as will be explained later, serves to store the pressure vessel cap 6 at the time of refuelling operations. The walls 32' and the bottom wall 32" are preferably covered with lead and are designed in the shape of a well.

The installation also comprises a leak-tight storage compartment 34 which, as can be seen from the figure, is located partly inside the outer containment vessel 2 and partly outside said vessel. The bottom wall 24 of the structure 22 has a second orifice 36 in order to ensure that the outer containment vessel 2 and the structure 22 are permitted to communicate with the storage compartment 34. The orifice 36 can be closed-off by means of a sash-gate valve 38.

There have been described thus far the stationary portions of the installation which surround the reactor proper. There will now be described the movable structure which are necessary for loading and unloading the reactor core.

It will first be noted that a plurality of containers 39 for storage of fresh or spent fuel assemblies are provided within the interior of the storage compartment 34. Each container 39 has a lead-shielded leak-tight outer casing 40 of generally cylindrical shape. A magazine 42 of the rotary drum type is mounted within the interior of the casing 40 and is capable of rotating about the vertical axis X—X'. Said magazine has a number of storage locations 44 (eight in the example herein described) which are each capable of receiving a fuel assembly. The rotary magazine can be equipped with an internal heat exchanger as described and illustrated in British Pat. No. 916,064. The top portion of the casing 40 of each container 39 is pierced by an orifice 46 through which a fuel assembly can be inserted. Said orifice is placed in such a manner as to ensure that the storage locations 44 each pass beneath the orifice 46 during their rotational displacement. Moreover, the orifice 46 is also fitted with a sash-gate valve which serves to close-off this latter. Each container is fitted at the lower end with runner-wheels 48 for displacing said containers within the storage compartment 34. The runner-wheels 48 cooperate with rails 50 (shown in chain-dotted lines in FIG. 6) which are mounted on the bottom wall of the storage compartment. By means of these rails, each container is capable of taking up a number of different work positions: the position 52a corresponding to removal or to insertion of the fuel assemblies from or into the container: the position 52b which corresponds to storage of the container within the storage compartment 34; and the position 52c which corresponds to the discharge of a container from the storage compartment. Discharge is carried out through an orifice 54 which is formed in the top wall of the storage compartment and opens to the exterior of the outer containment vessel 2. Said orifice 54 is obviously closed by a cover. Two inflatable seals (not shown) which are placed in series serve to obtain leak-tightness between the orifices 36 and 46.

The installation also comprises three movable machines which permit transfer of the pressure vessel cap 6, of the upper internal structures 12 and of the fuel assemblies 10. The first machine is the machine 56 for handling the vessel cap 6 and the upper internal structures 12. Said machine is constituted by a frame 58 fitted with rolling means 60 and these latter are adapted to cooperate with rails 62 which are fixed on the floor 28 and extend from the storage well 32 to the zone located above the orifice 26.

Figure 3:
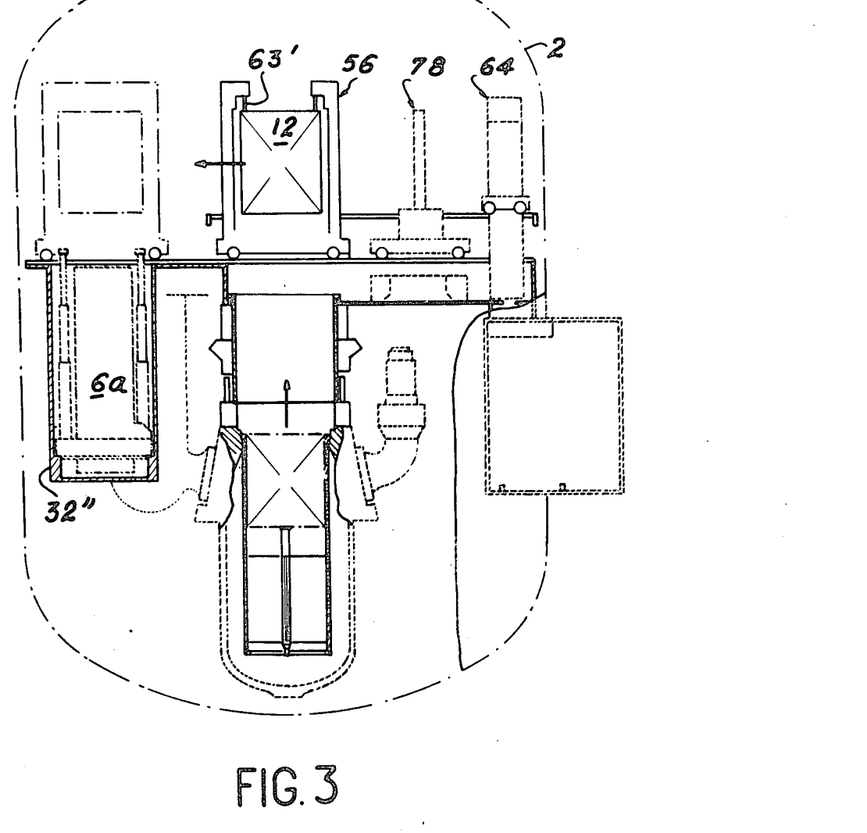

This installation further comprises independent lifting means consisting on the one hand of two sets of two telescopic jacks 63 which are each capble of lifting the pressure vessel cap and are shown in the extended position in FIG. 1. Said jacks are provided at their lower extremities with means for securing these latter to the vessel cap. When the cap 6 is stored within the well 32, the jacks 63 remain attached to this latter. On the other hand, the machine comprises a winch system 63' (as shown in FIG. 3) for lifting the upper internal structure 12.

The second machine is the transfer hood 64. This hood is capable of displacement by means of rolling means 66 adapted to cooperate with rails 67 which are mounted above the pool 22 and extend from the zone located above the orifice 26 to the zone located above the orifice 36. Said transfer hood comprises a portion 68 which is rigidly fixed to the rolling means 66. A lead-shielded portion 70 is capable of sliding in a vertical direction within the interior of the portion 68. The movable portion 70 is provided with a housing 71, the dimensions of which permit the introduction of a fuel assembly. The lower portion of the housing 71 is closed by an isolating valve. Finally, the transfer hood is provided with a lifting winch 72, the extremity of which is fitted with means for gripping the fuel assembly heads.

The third and last machine is the refuelling machine 74 and comprises rolling means 75 adapted to cooperate with rails 76 which form extensions of the rails 62. This machine comprises a frame 77 and a handling column 78. The column 78 forms a single unit during the handling stages and is telescopic so as to form two sections in order to facilitate storage. It is readily apparent that the column 78 is provided at the lower end with means for gripping the fuel assembly heads.

Figure 5:
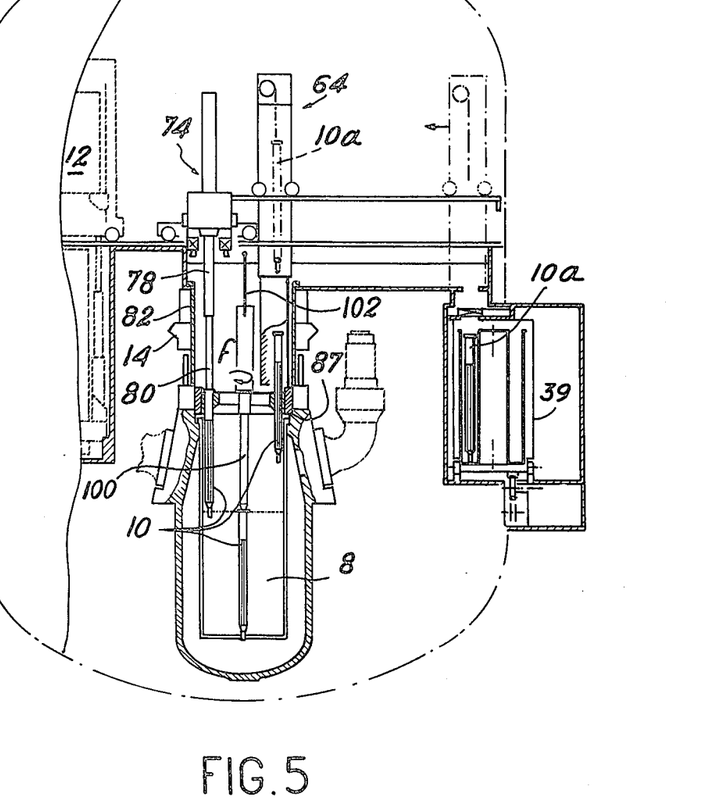

There is also shown in the drawings a removable shell 82 which serves to establish a leak-tight connection between the flange of the orifice 26 and the top flange 84 of the pressure vessel 4. Provision is finally made for a storage rack 86 as shown in the storage position in FIG. 1 which can be introduced through the top portion of the pressure vessel 4 and is intended to rest on the annular shoulder 87 (as shown in FIG. 5). The storage rack 86 has a stationary outer ring 88 and an inner ring 89 which is capable of moving with respect to the outer ring.

The movable inner ring 89 of the storage rack 86 has a number of intermediate storage locations for the fuel assemblies, provision being preferably made for three storage locations. Two diametrically opposite locations are employed for changing the positions of the fuel assemblies whilst the third location is employed for removing the absorber element from an irradiated fuel assembly and introducing said element into the fresh fuel assembly which is to be inserted into the reactor core. As will be explained hereinafter, each storage location is constituted by a recess which makes it possible to suspend a fuel assembly 10 by its gripping head. Rotational displacement of the movable portion 89 of the storage rack can be obtained for example by means of a toothed pinion in cooperating relation with a second toothed pinion driven by a motor which is rigidly fixed to the outer ring 88.

Figure 2:
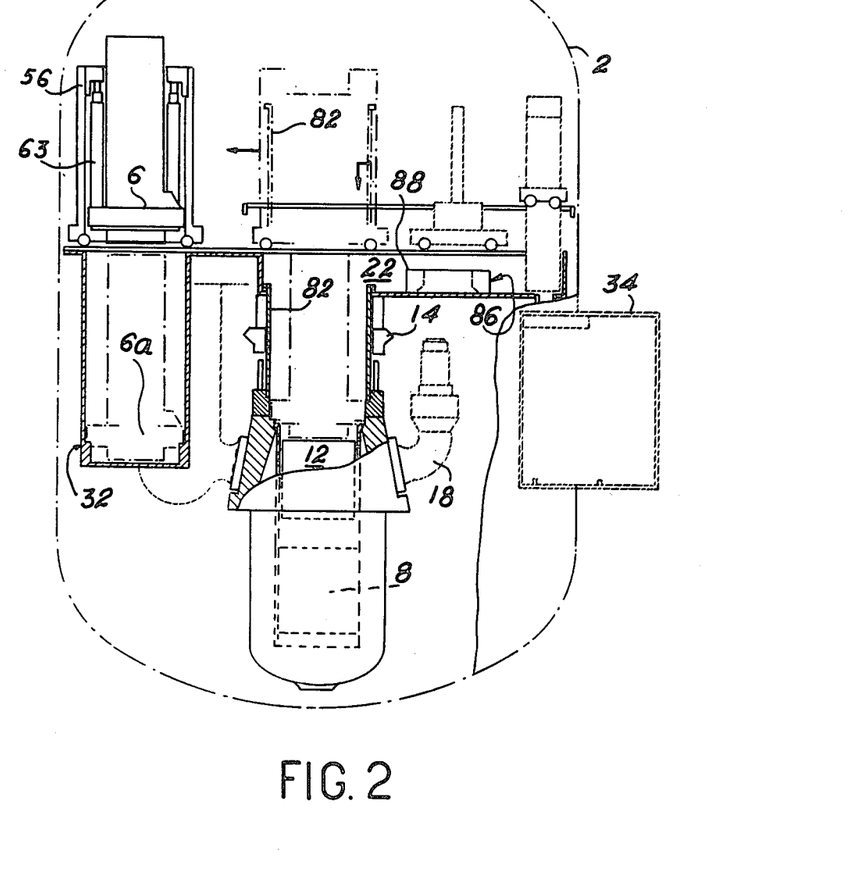
FIGS. 2 to 5 are sectional views in elevation of the reactor, showing the different positions of the movable elements of the installation during the different stages of loading of fuel assemblies.

FIG. 2 illustrates the first stage of unloading and reloading of the reactor core. The devices 14 for securing the closure cap 6 of the reactor vessel 4 are disconnected. The shell 82 which serves to guide the closure cap 6 both at the time of disassembly and at the time of reassembly as well as to provide leak-tightness between the bottom wall 24 of the pool 22 and the reactor vessel 4 is placed in position. The handling machine 56 is moved into position above the reactor vessel. By means of the telescopic jacks 63 which are secured to the closure cap 6, said cap is moved upwards and accordingly placed with respect to the machine 56 in the position shown in full lines. The machine 56 is displaced until it is located above the storage well 32 of the cap. The cap 6 is then moved downwards within said storage well to the position 6a which is shown in chain-dotted lines. For the sake of enhanced ease of handling operations, the jacks 63 are permitted to remain on the closure cap. The pool 22 is then filled with water and the same clearly applies to the space limited by the shell 82. FIG. 3 illustrates the withdrawal of the upper internal structure 12. To this end, the machine 56 is again brought into position above the reactor vessel. By means of the lifting winch 63', the upper internal structure is displaced upwards within the machine 56 and this latter is again brought into position above the cap storage well 32. The upper internal structure is left within the machine 56, lead shielding being provided within said machine by reason of the activity of the upper internal structure.

Figure 4:
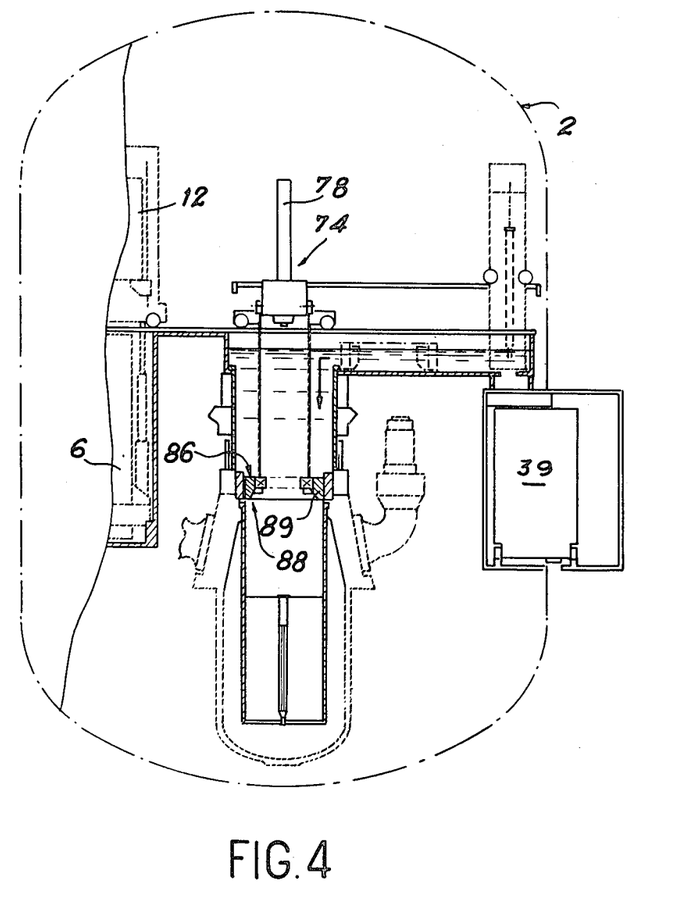

FIG. 4 illustrates the following stage which consists in positioning the rack 86 for intermediate storage of the fuel assemblies. This positioning operation is performed by means of winches which are rigidly fixed to the refuelling machine 74.

FIG. 5 illustrates the actual operation involved in loading and unloading of fuel assemblies.

This operation entails the need to employ both the refuelling machine 74 and the transfer hood 64. At the beginning of this stage, the containers 39 are full of fresh fuel assemblies and a container is located beneath the orifice 36. The head of the first fuel assembly to be lifted is engaged by the gripping column 78 and said assembly is moved upwards until its head is fixed within one of the recesses of the intermediate storage rack 86. At the same time, a fresh fuel assembly is withdrawn from the container 39 by means of the transfer hood 64 and said assembly is moved into that recess of the intermediate storage rack 86 which is located opposite to the recess containing the spent assembly. During this operation, the absorber element 100 is withdrawn from the spent fuel assembly by means of a rod 102 and placed within the third recess of the storage rack 86.

The movable portion 89 of the rack 86 is then rotated as indicated by the arrow f so as to bring the spent fuel assembly into position beneath the transfer hood 64 and so as to bring the fresh fuel assembly into position beneath the refuelling machine 74.

The absorber element is replaced within the fresh fuel assembly.

At the same time, the spent fuel assembly is discharged within the container by means of the transfer hood and the fresh fuel assembly is replaced within the reactor core by means of the refuelling machine.

In order to carry out the first operation, the movable portion 70 of the transfer hood is of course in the bottom position. By means of the winch 72, the fuel assembly is lifted into the compartment 71 of the movable portion 70, whereupon said portion is in turn lifted and the fuel assembly is located in the position shown in chain-dotted lines (10a).

The transfer hood 64 is then moved so as to be brought into position above the orifice 36 of the pool 22. By means of the hood-lifting means, the fuel assembly is returned downwards, the valves of the container and of the orifice 36 are opened and the fuel assembly is introduced into one of the storage locations 44 of the container 39. The rotary-drum magazine 42 is caused to rotate by one step so as to bring a magazine storage location containing a fresh fuel assembly into position opposite to the orifice 46.

When a container is completely filled, this latter is clearly displaced so as to bring an empty container in the case of unloading or a container full of fresh fuel assemblies in the case of loading.

It is in any case readily apparent that, when unloading and reloading operations are completed, the upper internal structure is replaced in position together with the vessel cap and its coupling flange. The water which was initially present within the pool is discharged to storage tanks provided within the outer containment vessel 2.

It is known that, at the time of loading and unloading operations, it may simply prove necessary to change the position of a spent fuel assembly within the reactor core without any need to discharge said assembly. This operation can readily be performed by employing the refuelling machine 74 for the handling operations and the storage rack 86 for intermediate storage of the spent fuel assemblies whose positions are to be changed.

It is apparent that this installation offers many advantages by reason of the fact that two machines are employed for loading and unloading fuel assemblies and by reason of the fact that the rack 86 provides a number of intermediate storage locations. The transfer hood 64 is capable of transferring fuel assemblies while, at the same time, the refuelling machine is withdrawing fuel assemblies from the reactor core so as to bring these latter into the intermediate storage rack, thus making it possible to carry out loading and unloading operations simultaneously and to achieve a saving of time.

Moreover, the absorber element is withdrawn from an irradiated fuel assembly only after this latter has been placed within the storage rack 86, that is to say outside the reactor core. This accordingly avoids the need to increase the concentration of boron during loading and unloading operations as is at present the case in conventional methods.

It is also found that the loading hood 64 which carries out an adjusted displacement on rails is never located completely above the reactor vessel. Moreover, by virtue of the telescopic transfer hood 64 and the telescopic loading column of the refuelling machine 74, the height which is necessary above the floor 28 is very small. The design of the installation according to the invention avoids any danger of radioactive contamination outside the outer containment vessel 2 and this applies particularly to the storage compartment 34 and the containers 39.

Furthermore, the method adopted for loading said containers through the bottom of the pool reduces the height of biological shielding to an appreciable extent. When loading and unloading operations are not being performed, the different movable portions of the installation are clearly secured in a stationary position. For example, the transfer machine 56 of the vessel cap is fixed in position above the cap storage well, the loading hood 64 is fixed in position above the orifice 35 and the refuelling machine is clamped in position on its track.

An installation which is slightly simplified with respect to the arrangements described in the foregoing could be employed without thereby departing from the scope of the invention. In this installation, only the transfer hood 64 is employed for loading and unloading fuel assemblies and the refuelling machine 74 is therefore dispensed with.

Similarly, the storage rack 86 no longer serves any useful purpose. This alternative form of construction has the advantage of simplifying the installation but nevertheless complicates the handling operation and reduces the speed of loading and unloading operations.

What we claim is:

1. A nuclear reactor of the water-cooled type, comprising an outer containment vessel, a pressure vessel in the lower portion of said outer vessel, a top flange and a top closure cap for said pressure vessel and containing a reactor core, a plurality of vertical fuel assemblies for said core, upper internal structures above said core and said pressure vessel, a structure having a horizontal bottom wall serving as a pool, a first orifice in said bottom wall located above said pressure vessel and having a diameter slightly larger than that of said closure cap, a second orifice in said bottom wall in communication between said structure and a leak-tight storage compartment partially within said outer containment vessel and partially exterior to said outer containment vessel and at a lower level than said structure, closure means for said second orifice, said compartment receiving containers for the storage of fuel assemblies, means for moving said containers from a position beneath said second orifice to a position beneath a third orifice in said storage compartment opening to the exterior of said outer containment vessel, said third orifice providing for discharge of containers through it, a storage zone for said pressure vessel closure cap, first means for lifting said pressure vessel closure cap and for transferring said cap to said storage zone, second means for lifting the fuel assemblies and transferring said assemblies directly from said reactor core to said storage compartment and a removable shell providing a leak-tight connection between said bottom wall of said structure at the level of said first orifice and said top flange of said pressure vessel said first means for lifting including means for storing said removable shell.

2. A reactor according to claim 1, wherein the first lifting means are costituted by an assembly which is movable on rails extending above the pool from the zone located above the first orifice of said pool to the closure-cap storage zone.

3. A nuclear reactor according to claim 1, wherein the second means for lifting and transferring fuel assemblies are constituted by a telescopic transfer hood displaceable by rolling means on rails which extend above the structure aforesaid between the zone located above the first orifice of the structure to the zone located above the second orifice of said structure, said transfer hood being such as to have a first portion which is rigidly fixed to rolling means and a second movable portion which is capable of sliding in a vertical direction within said first portion, said movable portion being provided with a compartment which is capable of containing a fuel assembly and means for lifting the fuel assemblies into said compartment.

4. A nuclear reactor according to claim 1, wherein said storage compartment contains a plurality of containers, each container being provided with an outer casing and a magazine of the rotary drum type having a number of fuel assembly storage locations, said outer casing being provided with an orifice beneath which each storage location of the magazine is capable of passing, said container being fitted with an internal heat exchanger for cooling the stored fuel assemblies.

5. A reactor according to claim 1, wherein the orifice of a container casing is located opposite to the second orifice of said structure when said container is placed beneath said orifice, the orifice of the container casing and the second orifice of the structure being each fitted with a valve.

6. A reactor according to claim 1, wherein the second means for transferring fuel assemblies comprise in addition to the transfer hood a refuelling machine which is capable of moving along rails in a zone adjacent to the first orifice of said structure, said machine being provided with means for running along said rails, and a vertical telescopic column terminating at the lower end in means for gripping fuel assemblies, and wherein said reactor comprises a removable rack for intermediate storage of the fuel assemblies and comprising a plurality of engagement locations, said storage rack being such as to have the general shape of a circular ring which rests on an annular shoulder of the internal wall of the pressure vessel, said storage rack being provided with means for producing rotational displacement about the axis of said pressure vessel, said storage rack being placed at a height above the reactor core such that said fuel assemblies are completely withdrawn from said reactor core in the engagement position.

* * * * *